US012374478B2

(12) United States Patent
Tsukahara et al.

(10) Patent No.: US 12,374,478 B2
(45) Date of Patent: Jul. 29, 2025

(54) SOFT MAGNETIC ALLOY RIBBON AND MAGNETIC COMPONENT

(71) Applicant: TDK CORPORATION, Tokyo (JP)

(72) Inventors: Takuya Tsukahara, Tokyo (JP); Isao Nakahata, Tokyo (JP); Kazuhiro Yoshidome, Tokyo (JP); Hiroyuki Matsumoto, Tokyo (JP)

(73) Assignee: TDK CORPORATION, Tokyo (JP)

(*) Notice: Subject to any disclaimer, the term of this patent is extended or adjusted under 35 U.S.C. 154(b) by 45 days.

(21) Appl. No.: 16/952,770

(22) Filed: Nov. 19, 2020

(65) Prior Publication Data

US 2021/0159001 A1 May 27, 2021

(30) Foreign Application Priority Data

Nov. 22, 2019 (JP) ............................ JP2019-211339

(51) Int. Cl.

| | |
|---|---|
| ***H01F 1/153*** | (2006.01) |
| ***C22C 38/00*** | (2006.01) |
| ***C22C 38/02*** | (2006.01) |
| ***C22C 38/12*** | (2006.01) |

(52) U.S. Cl.

CPC ....... *H01F 1/15333* (2013.01); *C22C 38/002* (2013.01); *C22C 38/02* (2013.01); *C22C 38/12* (2013.01); *C22C 2200/04* (2013.01); *C22C 2202/02* (2013.01)

(58) Field of Classification Search

None

See application file for complete search history.

(56) References Cited

U.S. PATENT DOCUMENTS

| | | | |
|---|---|---|---|
| 2009/0065100 A1 | 3/2009 | Yoshizawa et al. | |
| 2010/0230010 A1 | 9/2010 | Yoshizawa et al. | |
| 2017/0088933 A1* | 3/2017 | Launey .................... | C23G 1/10 |
| 2020/0224286 A1* | 7/2020 | Takanezawa ........ | C21D 8/1244 |

FOREIGN PATENT DOCUMENTS

| | | |
|---|---|---|
| JP | H1-247555 A | 10/1989 |
| JP | H2-236259 A | 9/1990 |
| JP | 2000-313946 A | 11/2000 |
| JP | 2007-182594 A | 7/2007 |
| JP | 2009-263775 A | 11/2009 |
| JP | 2011-149045 A | 8/2011 |

OTHER PUBLICATIONS

Dan (Materials Transaction, 2013, vol. 54, No. 9, p. 1691-1696). (Year: 2013).*

Machine translation of JP2000-313946. (Year: 2000).*

* cited by examiner

*Primary Examiner* — Xiaowei Su

(74) *Attorney, Agent, or Firm* — Oliff PLC

(57) ABSTRACT

A soft magnetic alloy ribbon having high corrosion resistance is obtained. The soft magnetic alloy ribbon contains Fe, P, and Si. A maximum point of a concentration of P and a maximum point of a concentration of Si including in oxides is present in a region within 20 nm from the surface, when a concentration distribution of an element contained in the soft magnetic alloy ribbon is measured from a surface toward an interior of the soft magnetic alloy ribbon in a thickness direction.

7 Claims, 4 Drawing Sheets

SOFT MAGNETIC ALLOY RIBBON AND MAGNETIC COMPONENT

BACKGROUND OF THE INVENTION

Field of the Invention

The present invention relates to a soft magnetic alloy ribbon and a magnetic component.

Description of the Related Art

As one form of a soft magnetic material, a soft magnetic alloy material is known. Further, a magnetic core using a soft magnetic alloy ribbon obtained by forming a soft magnetic alloy material into a ribbon shape is known.

Patent Document 1 describes an invention related to an amorphous alloy ribbon, a nanocrystalline soft magnetic alloy, and the like. According to Patent Document 1, segregation of C generated on a surface of the ribbon can be controlled by controlling an amount of C in the ribbon and further controlling a gas atmosphere in a vicinity of a cooling roll.

Patent Document 2 describes an invention related to an amorphous alloy ribbon, a nanocrystalline soft magnetic alloy, and the like. According to Patent Document 2, segregation of Cu generated on a surface of the ribbon can be controlled by controlling a temperature of the ribbon on a roll during manufacturing the ribbon.

Patent Document 3 describes a soft magnetic alloy ribbon that has a base phase in which fine crystal grains having an average grain size of 60 nm or less are dispersed in an amorphous substance at a volume fraction of 50% or more, and that has an oxide film on a surface, in which a part of the oxide film has a B concentration lower than an average B concentration in the base phase.

[Patent Document 1] Japanese Patent Laid-Open No. 2007-182594

[Patent Document 2] Japanese Patent Laid-Open No. 2009-263775

[Patent Document 3] Japanese Patent Laid-Open No. 2011-149045

Generally, the soft magnetic alloy ribbon is manufactured by a super-rapid cooling method such as a single-roll method. In a case of mass production, the soft magnetic alloy ribbon is generally manufactured in an air atmosphere. Therefore, Fe in a vicinity of a surface of the soft magnetic alloy ribbon is subjected to oxidized, and a total amount of magnetic materials decreases. Patent Document 1 and Patent Document 2 do not describe the oxidation of Fe. Since the oxide film of the soft magnetic alloy ribbon in Patent Document 3 is thick, the total amount of magnetic materials is reduced.

SUMMARY OF THE INVENTION

An object of the present invention is to obtain a soft magnetic alloy ribbon having high corrosion resistance.

In order to achieve the above object, a soft magnetic alloy ribbon according to the present invention includes Fe;

P; and

Si, in which a maximum point of a concentration of P, and a maximum point of a concentration of Si included in oxides are present in a region within 20 nm from the surface, when a concentration distribution of an element contained in the soft magnetic alloy ribbon is measured from a surface toward an interior of the soft magnetic alloy ribbon in a thickness direction.

The soft magnetic alloy ribbon according to the present invention has the above features, and thus becomes a soft magnetic alloy ribbon having high corrosion resistance.

The maximum point of the concentration of P may be farther from the surface than the maximum point of the concentration of Si.

A maximum value of the concentration of P at the maximum point of the concentration of P may be 1.5 times or more of a concentration of P in the interior of the soft magnetic alloy ribbon.

A maximum value of the concentration of Si at the maximum point of the concentration of Si is 2.0 times or more of a concentration of Si in the interior of the soft magnetic alloy ribbon.

The soft magnetic alloy ribbon according to the present invention may have a composition ratio of Si of 0.1 at % or more and 10 at % or less.

The soft magnetic alloy ribbon according to the present invention may have a composition ratio of P of 0.1 at % or more and less than 4.0 at %.

The soft magnetic alloy ribbon according to the present invention, in which amorphous may be observed in the ribbon.

The soft magnetic alloy ribbon according to the present invention, in which nanocrystals may be included in the ribbon.

A magnetic component according to the present invention includes the soft magnetic alloy ribbon described above.

DETAILED DESCRIPTION OF THE PREFERRED EMBODIMENT

Hereinafter, embodiments of the invention are explained with the Figures.

A dimension of a soft magnetic alloy ribbon of the present embodiment is not particularly limited. For example, a thickness may be 5 μm to 30 μm and a width may be 5 mm to 250 mm.

The soft magnetic alloy ribbon of the present embodiment contains Fe, P, and Si. When concentration distributions of elements contained in the soft magnetic alloy ribbon are measured from a surface toward an interior of the soft magnetic alloy ribbon in a thickness direction, a maximum point of a concentration of P and a maximum point of a concentration of Si including in oxides are present in a region within 20 nm from the surface.

When the maximum point of the concentration of Si including in oxides and the maximum point of the concentration of P are present in the region within 20 nm from the surface, oxidation of Fe can be prevented, and corrosion resistance of the soft magnetic alloy ribbon is improved. Further, magnetic properties are also improved.

It is preferable that the maximum point of the concentration of P is farther from the surface than the maximum point of the concentration of Si including in oxides. When a portion having a high concentration of P is formed in a portion (a portion far from the surface) deeper than a portion having a high concentration of Si including in oxides, an effect of preventing the oxidation of Fe is further improved.

Figure 1:
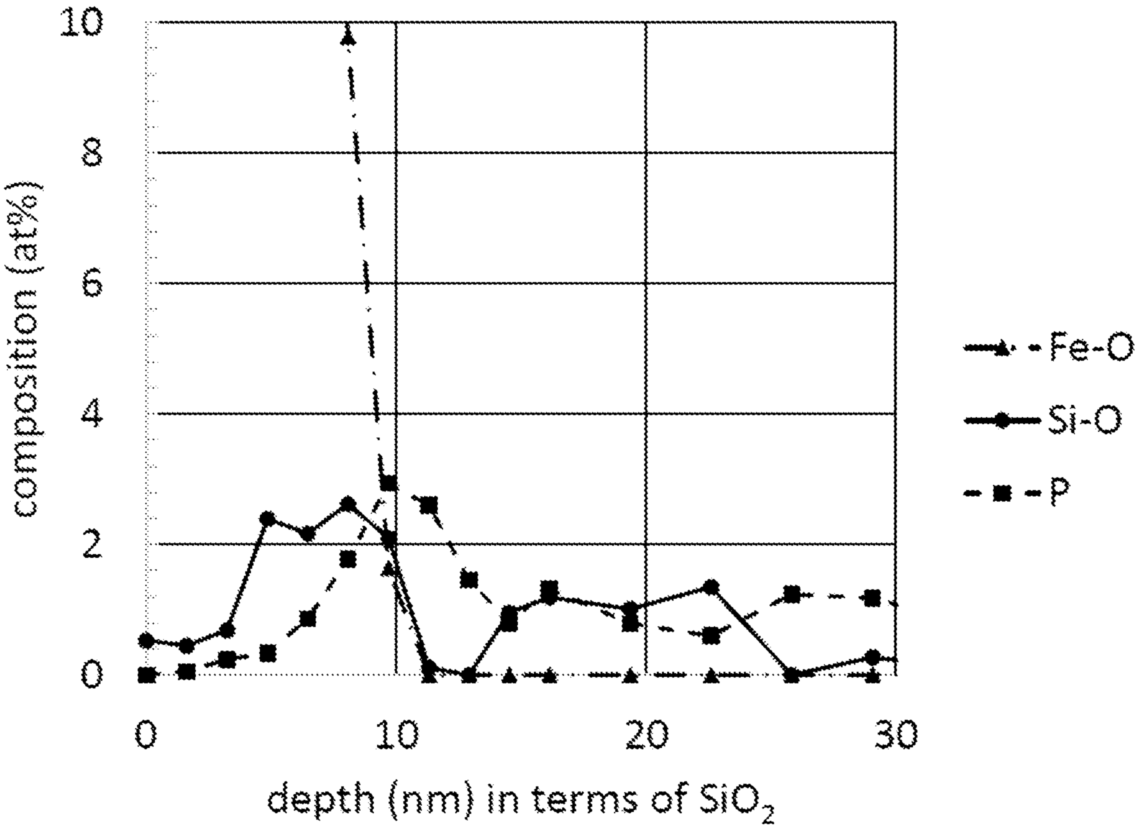
FIG. 1 is a graph showing a relationship between a depth from a surface and a composition.

In fact, FIG. 1 shows results of measuring the concentration distribution of the elements contained in the soft magnetic alloy ribbon from the surface toward the interior in the thickness direction using X-ray photoelectron spectroscopy (XPS) for the soft magnetic alloy ribbon of the present embodiment. Since it is possible to distinguish a simple substance from an oxide with XPS, it is possible to measure the concentration distribution of each element including in oxides. The soft magnetic alloy ribbon of the present embodiment has irregularities on the surface, but the concentration distribution of each element can be measured according to a depth in terms of $SiO_2$ from the surface by using XPS. As another method for measuring the concentration distribution of each element, a method using a transmission electron microscope is used instead of XPS. The concentration distribution of each element can be measured by using energy dispersive X-ray spectroscopy (EDS) and electron energy loss spectroscopy (EELS) using a transmission electron microscope. Similar to XPS, EELS can measure the valence of an element, so that it is possible to distinguish a simple substance and from an oxide.

As shown in FIG. 1, a maximum point of a concentration of Si—O (Si including in oxides) and a maximum point of a concentration of P are present in the region within 20 nm from the surface (depth in terms of $SiO_2$: 0 nm).

The concentration distribution is measured such that a distance between measurement points is 1.0 nm or more and 4.0 nm or less in terms of $SiO_2$ in a region within 50 nm from the surface.

A method for confirming the maximum point of the concentration in the present embodiment will be described below. First, a concentration at each measurement point within a measurement range of the concentration distribution is confirmed. The measurement point having a concentration higher than that of any one of adjacent measurement points is the maximum point. When two or more adjacent measurement points have the same concentration, the two or more measurement points are regarded as a single measurement point group. When the concentration of the measurement point group is higher than the concentration of any measurement points adjacent to the measurement point group, the measurement point closest to the surface among the measurement point group is the maximum point.

A maximum value of the concentration of P at the maximum point of the concentration of P may be 1.5 times or more that of the concentration of P in the interior of the soft magnetic alloy ribbon. A maximum value of the concentration of Si including in oxides at the maximum point of the concentration of Si including in oxides may be 2.0 times or more of a concentration of Si in the interior of the soft magnetic alloy ribbon. When these conditions are satisfied, the corrosion resistance is further improved.

Specifically, a concentration of each element in the interior of the soft magnetic alloy ribbon is an average value of a concentration of each element in a portion 1.0 μm to 1.3 μm from the surface of the soft magnetic alloy ribbon. Generally, the concentration of each element in the interior of the soft magnetic alloy ribbon generally matches a composition ratio of each element in the entire soft magnetic alloy ribbon.

The composition ratio of Si in the soft magnetic alloy ribbon of the present embodiment is not particularly limited, and may be 0.05 at % or more and 18 at % or less, or 0.05 at % or more and 11 at % or less, or 1 at % or more and 5 at % or less. When the composition ratio of Si is within the above range, the corrosion resistance is likely to be improved.

The composition ratio of P in the soft magnetic alloy ribbon of the present embodiment is not particularly limited, and the composition ratio of P may be 0.05 at % or more and 15 at % or less, or 0.05 at % or more and 8.0 at % or less, or 0.1 at % or more and 4.0 at % or less. When the composition ratio of P is within the above range, a portion having a high concentration of P is likely to be formed in a vicinity of the surface of the soft magnetic alloy ribbon, and the corrosion resistance is likely to be improved.

A microstructure of the soft magnetic alloy ribbon of the present embodiment is not particularly limited. For example, the soft magnetic alloy ribbon of the present embodiment may have a structure composed of only amorphous substances, and may have a nanohetero structure in which initial microcrystals are present in amorphous substances. An average grain size of the initial microcrystals may be 0.3 nm to 10 nm. In the present embodiment, it is assumed that when an amorphization ratio to be described later is 85% or more, the soft magnetic alloy ribbon has the structure formed of only amorphous substances or has the nanohetero structure.

The soft magnetic alloy ribbon of the present embodiment may have a structure formed of nanocrystals. In addition, among the structures formed of nanocrystals, a structure formed of Fe-based nanocrystals may be particularly provided.

The nanocrystal refers to a crystal in which a grain size is in a nano-order. The Fe-based nanocrystal refers to a crystal in which a grain size is in a nano-order and a crystal structure of Fe is bcc (body-centered cubic lattice structure). In the present embodiment, it is preferable to deposit Fe-based nanocrystals having an average grain size of 5 nm to 30 nm. A soft magnetic alloy ribbon 24 in which such Fe-based nanocrystals are deposited is likely to have a high saturation magnetic flux density and is likely to have a low coercive force. In the present embodiment, when the soft magnetic alloy ribbon has a structure containing nanocrystals and a structure containing Fe-based nanocrystals, the amorphization ratio to be described later is less than 85%.

Hereinafter, a method for confirming whether the soft magnetic alloy ribbon has a structure formed of amorphous substances (a structure composed of only amorphous substances or a nanohetero structure) or a structure formed of crystals is described. In the present embodiment, the soft magnetic alloy ribbon having an amorphization ratio X of 85% or more shown in the following Equation (1) has the structure formed of amorphous substances, and the soft magnetic alloy ribbon having an amorphization ratio X of less than 85% has the structure formed of crystals.

$$X=100-(Ic/(Ic+Ia)\times 100) \quad (1)$$

Ic: crystalline scattering integrated intensity

Ia: amorphous scattering integrated intensity

The amorphization ratio X is calculated according to the above Equation (1) by performing crystal structure analysis for the soft magnetic alloy ribbon by using X-ray diffraction (XRD), identifying a phase, reading a peak (Ic: crystalline scattering integrated intensity, Ia: amorphous scattering integrated intensity) of crystallized Fe or a compound, and calculating the crystallization ratio based on a peak intensity. The calculation method will be described in more detail below.

Figure 2:
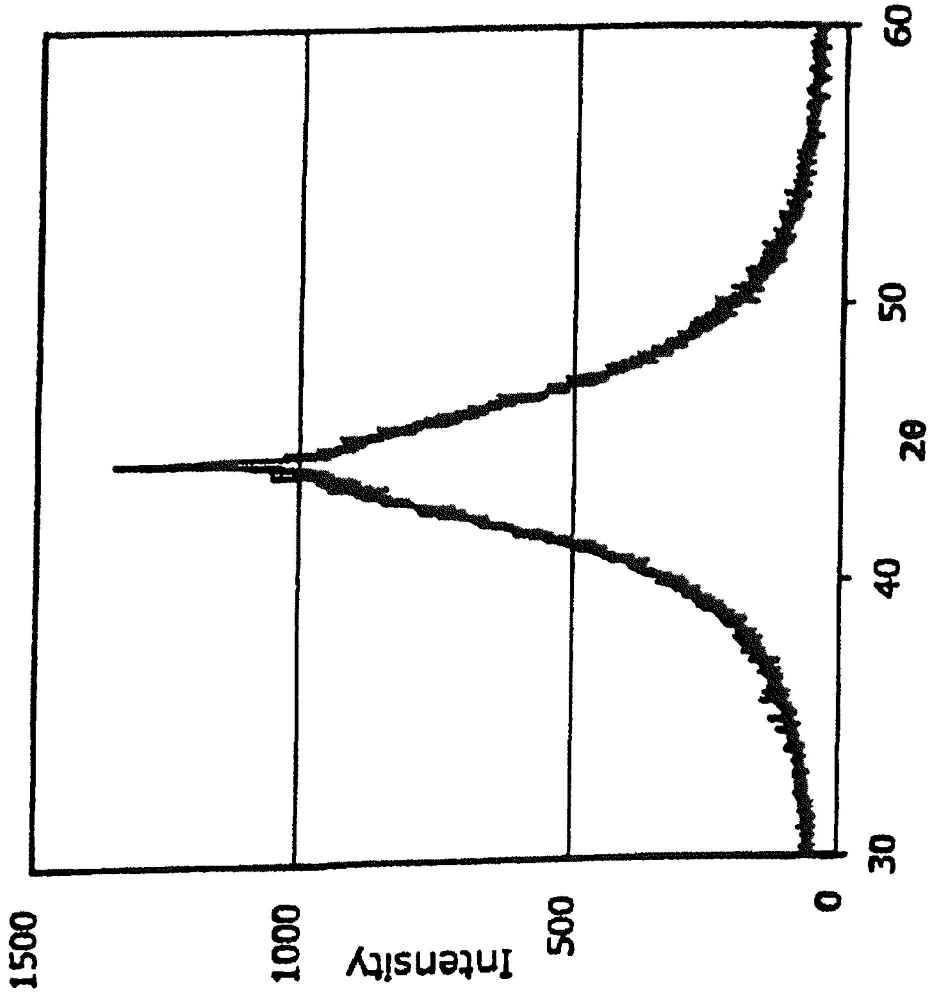
FIG. 2 is an example of a chart obtained by X-ray crystal structure analysis.
Figure 3:
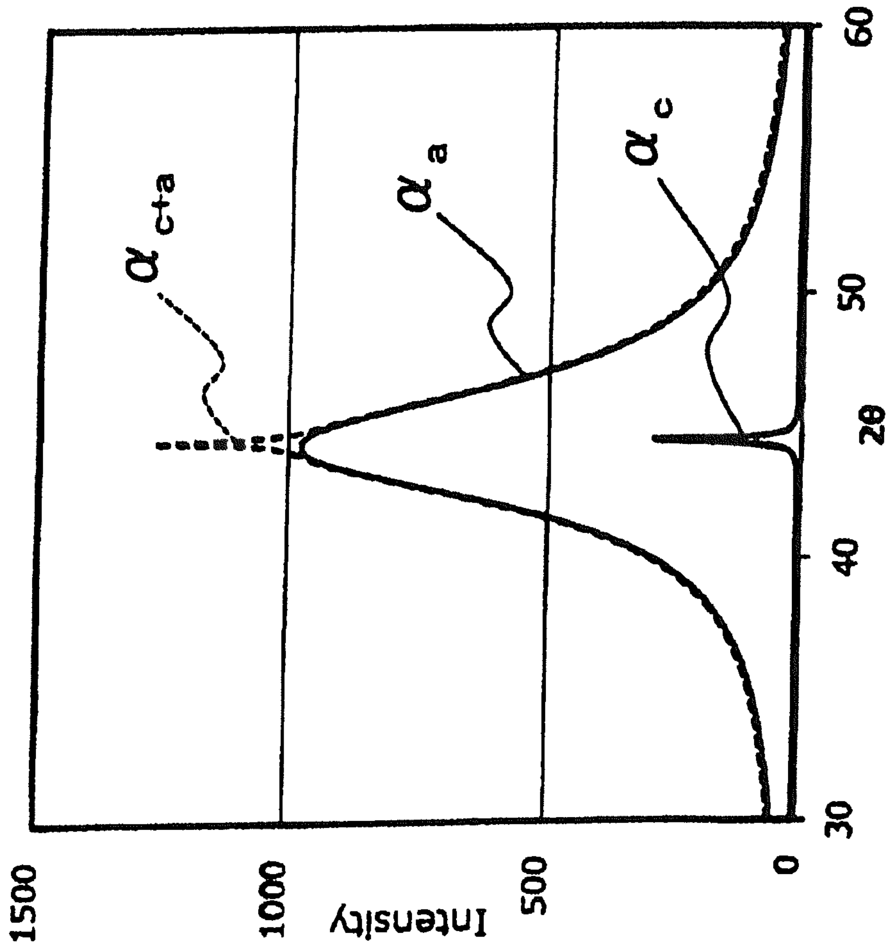
FIG. 3 is an example of a pattern obtained by profile fitting the chart in FIG. 2.

The crystal structure analysis for the soft magnetic alloy ribbon of the present embodiment is performed by using XRD and a chart as shown in FIG. 2 is obtained. The chart is subjected to profile fitting by using a Lorenz function represented by the following Equation (2) to obtain a crystal component pattern $\alpha_c$ showing the crystalline scattering integrated intensity, an amorphous component pattern $\alpha_a$ showing the amorphous scattering integrated intensity, and a pattern $\alpha_{c+a}$ combining the crystal component pattern $\alpha_c$ and the amorphous component pattern $\alpha_a$, as shown in FIG. 3. Based on the crystalline scattering integrated intensity and the amorphous scattering integrated intensity of the obtained pattern, the amorphization ratio X is determined according to the above Equation (1). The measurement range is a range of a diffraction angle 2θ=30° to 60° where an amorphous-derived halo can be seen. In this range, an error between an integrated intensity measured by using XRD and an integrated intensity calculated using the Lorentz function is within 1%.

$$f(x) = \frac{h}{1 + \frac{(x-u)^2}{w^2}} + b \quad (2)$$

h: peak height
u: peak position
w: half-value width
b: background height

The soft magnetic alloy ribbon of the present embodiment may contain a main component represented by a composition formula $(Fe_{(1-(\alpha+\beta))}X1_{\alpha}X2_{\beta})_{(1-(a+b+c+d))}M_aB_bP_cSi_d$, in which X1 is one or more selected from the group consisting of Co and Ni, X2 is one or more selected from the group consisting of Al, Mn, Ag, Zn, Sn, As, Sb, Cu, Bi, S, N, O, and a rare earth element, M is one or more selected from the group consisting of Nb, Ta, W, Zr, Hf, Mo, Cr, and Ti, $0 \le a \le 0.150$ $0.010 \le b \le 0.200$ $0.0005 \le c \le 0.150$ $0.0005 \le d \le 0.180$ $\alpha \ge 0$ $\beta \ge 0$, and $0 \le \alpha+\beta \le 0.50$ may be satisfied.

When the soft magnetic alloy ribbon having the above composition is subjected to a heat treatment, the Fe-based nanocrystals are likely to be deposited in the soft magnetic alloy ribbon.

Hereinafter, each component other than P and Si in the soft magnetic alloy ribbon 24 of the present embodiment will be described in detail.

The M content (a) may satisfy $0 \le a \le 0.150$. In addition, $0.020 \le a \le 0.080$ may be satisfied.

The B content (b) may satisfy $0.010 \le b \le 0.200$. In addition, $0.020 \le b \le 0.120$ may be satisfied.

The Fe content (1−(a+b+c+d)) is not particularly limited, and $0.700 \le (1-(a+b+c+d)) \le 0.900$ may be satisfied.

In the soft magnetic alloy ribbon of the present embodiment, a part of Fe may be substituted by X1 and/or X2.

X1 is one or more selected from the group consisting of Co and Ni. The X1 content may be α=0. That is, X1 may not be contained. The number of atoms of X1 is preferably 40 at % or less, with respect to a total number of atoms of 100 at % in the composition. That is, $0 \le \alpha\{1-(a+b+c+d)\} \le 0.40$ is preferably satisfied.

X2 is one or more selected from the group consisting of Al, Mn, Ag, Zn, Sn, As, Sb, Cu, Bi, S, N, O, and a rare earth element. The X2 content may be β=0. That is, X2 may not be contained. The number of atoms of X2 is preferably 3.0 at % or less, with respect to a total number of atoms of 100 at % in the composition. That is, $0 \le \beta\{1-(a+b+c+d)\} \le 0.030$ is preferably satisfied. Oxygen, which is contained in the vicinity of the surface and includes in oxides with Si, is also contained in X2, but may be in a trace amount when viewed from the entire soft magnetic alloy ribbon and may be ignored.

The amount of substitution of Fe by X1 and/or X2 is a half or less of Fe based on the number of atoms. That is, $0 \le \alpha+\beta \le 0.50$ may be satisfied.

The soft magnetic alloy ribbon of the present embodiment may contain elements other than the above elements as inevitable impurities. For example, the soft magnetic alloy ribbon of the present embodiment may contain the inevitable impurities in an amount of 0.1 wt % or less with respect to 100 wt % of the soft magnetic alloy ribbon.

The composition for easily obtaining the soft magnetic alloy ribbon having Fe-based nanocrystals by a heat treatment is described above, but the microstructure of the soft magnetic alloy ribbon is not particularly limited, and the composition of the soft magnetic alloy ribbon is not particularly limited except that the composition contains P and Si.

(Method for Manufacturing Soft Magnetic Alloy Ribbon)

A method for manufacturing the soft magnetic alloy ribbon of the present embodiment will be described below.

The method for manufacturing the soft magnetic alloy ribbon of the present embodiment is not particularly limited. For example, there is a method for manufacturing the soft magnetic alloy ribbon by a single-roll method. The ribbon may be a continuous ribbon.

In the single-roll method, first, pure raw materials of elements contained in the soft magnetic alloy ribbon to be finally obtained are prepared and weighed so as to have the composition same as that of the soft magnetic alloy ribbon to be finally obtained. Then, the pure raw materials of elements are melted and mixed to prepare a base alloy. A method for melting the pure raw materials is optionally, and, for example, there is a method for melting the pure raw materials by high-frequency heating after vacuum-evacuating the pure raw materials in a chamber. The base alloy and the soft magnetic alloy ribbon to be finally obtained have the same composition.

Next, the prepared base alloy is heated and melted to obtain a molten metal. A temperature of the molten metal is not particularly limited, and may be, for example, 1,200° C. to 1,500° C.

Figure 4:
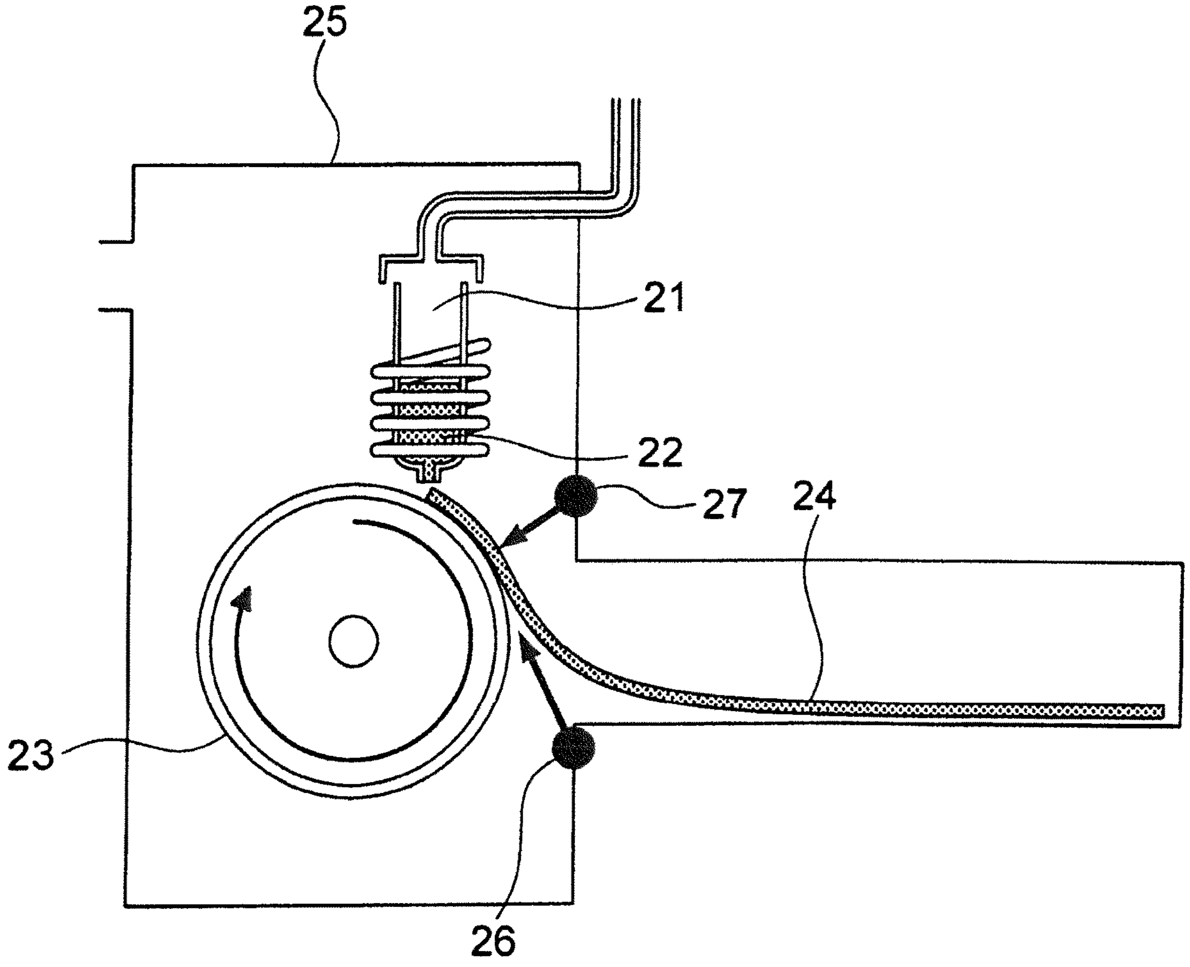
FIG. 4 is a schematic view of manufacturing device of a rapid cooling ribbon used in a single-roll method.

FIG. 4 shows a schematic view of a manufacturing device of a rapid cooling ribbon used in the single-roll method of the present embodiment. In a chamber 25, a molten metal 22 is rapidly cooled by injecting and supplying the molten metal 22 as a continuous liquid from a nozzle 21 to a roll 23 rotating in a direction of an arrow through a slit at a bottom of the nozzle 21, and the ribbon 24 that is uniform in a rotation direction of the roll 23 is manufactured. In the present embodiment, a material of the roll 23 is, for example, Cu. An atmosphere inside the chamber 25 is not particularly limited, and it is particularly suitable for mass production that the atmosphere inside the chamber 25 is an air atmosphere.

In the present embodiment, as shown in FIG. 4, the manufacturing device of a rapid cooling ribbon used in the single-roll method includes a release gas injection device 26 and a spray gas injection device 27. By controlling an oxygen concentration of gas injected from the release gas injection device 26 and the spray gas injection device 27, the concentration distribution of the oxide of each element in the vicinity of both surfaces of the ribbon can be controlled.

The oxygen concentrations in release gas and spray gas are not particularly limited, and may be 0.5% to 100%, or 5% to 100%, or 30% to 100%. Injection pressures of the release gas and the spray gas are not particularly limited. For example, the injection pressure is 10 kPa or more and 300 kPa or less. The release gas and the spray gas may have the same oxygen concentration and/or injection pressure, and may have different oxygen concentrations and/or injection pressures.

The soft magnetic alloy ribbon 24 obtained by the above method may not contain crystals having a grain size larger than 30 nm. The soft magnetic alloy ribbon 24 may have the structure formed of only amorphous substances, and may have the nanohetero structure in which crystals having a grain size of 30 nm or less are present in amorphous substances.

A method for confirming whether crystals having a grain size larger than 30 nm are contained in the soft magnetic alloy ribbon 24 is not particularly limited. For example, a presence or absence of crystals having a grain size larger than 30 nm can be confirmed by normal X-ray diffraction measurement. The presence or absence of crystals having a grain size larger than 30 nm may be confirmed by direct observation using a transmission electron microscope.

A method for observing the presence or absence and the average grain size of the microcrystal is not particularly limited, and for example, the presence or absence and the average grain size of the microcrystal can be confirmed by using a transmission electron microscope to obtain a selected area electron diffraction image, a nano beam diffraction image, a bright field image or a high resolution image of a sample sliced by ion milling. In the case of using a selected area electron diffraction image or a nano beam diffraction image is used, ring-shaped diffraction is formed when a diffraction pattern is amorphous, whereas a diffraction spot due to a crystal structure is formed when the diffraction pattern is not amorphous. In the case of using a bright field image or a high resolution image, the presence or absence and the average grain size of the microcrystal can be observed by visual observation at a magnification of $1.00\times10^5$ times to $3.00\times10^5$ times.

By controlling the oxygen concentration of the gas injected from the release gas injection device 26 and the spray gas injection device 27, the soft magnetic alloy ribbon 24 in which the concentration distribution of P and the concentration distribution of the oxide of Si of the present embodiment are formed is obtained.

Heat treatment conditions for depositing nanocrystals, especially Fe-based nanocrystals are not particularly limited as long as oxidation of the surface of the soft magnetic alloy ribbon does not proceed. Preferred heat treatment conditions differ depending on the composition of the soft magnetic alloy ribbon. Generally, a preferred heat treatment temperature is about 400° C. to 700° C., and a preferred heat treatment time is about 0.5 hour to 10 hours. However, depending on the composition, there may be a preferred heat treatment temperature and a preferred heat treatment time outside the above ranges. In order to maintain a surface state of the soft magnetic alloy ribbon, a heat treatment is performed in an inert atmosphere such as Ar gas or in a vacuum atmosphere.

By performing the heat treatment in the inert atmosphere or in the vacuum atmosphere, while the surface state is maintained, diffusion of the elements constituting the soft magnetic alloy ribbon 24 can be promoted, a thermodynamic equilibrium state can be reached in a short time, and distortion and stress present in the soft magnetic alloy ribbon can be eliminated. As a result, a soft magnetic alloy having an improved saturation magnetic flux density can be easily obtained. Further, the Fe-based nanocrystals are deposited. Therefore, by performing the heat treatment at a temperature equal to or higher than the temperature at which the Fe-based nanocrystals are deposited in the inert atmosphere, the soft magnetic alloy ribbon having further improved saturation magnetic flux density can be easily obtained.

Generally, when the soft magnetic alloy ribbon contains amorphous substances and does not contain crystals, the coercive force of the soft magnetic alloy ribbon is low, but when the soft magnetic alloy ribbon having a low saturation magnetic flux density contains nanocrystals, the coercive force is lower and the saturation magnetic flux density is improved as compared with the case where the soft magnetic alloy ribbon contains amorphous substances and does not contain crystals. When the soft magnetic alloy ribbon contains crystals larger than nanocrystals, the saturation magnetic flux density is improved but the coercive force is remarkably increased as compared with the case where the soft magnetic alloy ribbon contains the amorphous substances and does not contain the crystals. However, in any case, when the maximum point of the concentration of P and the maximum point of the concentration of Si including in oxides are present in the region within 20 nm from the surface, the corrosion resistance is improved compared to a case where the maximum point of the concentration of P and the maximum point of the concentration of Si including in oxides are not present in the region within 20 nm from the surface.

Hereinafter, a method for obtaining a core and an inductor of the present embodiment will be described, and the method for obtaining a core and an inductor from the soft magnetic alloy ribbon is not limited to the following method.

A method for obtaining a core from the soft magnetic alloy ribbon includes, for example, a method for winding the soft magnetic alloy ribbon and a method for laminating the soft magnetic alloy ribbon. When the soft magnetic alloy ribbon is laminated via an insulator, a core having improved properties can be obtained.

In addition, an inductor is obtained by applying a winding to the core. A method for applying the winding and a method for manufacturing the inductor are not particularly limited. For example, a method for winding at least one turn on the core manufactured by the above method can be used.

A magnetic component of the present embodiment, particularly the core and the inductor (coil) using the core, is obtained from the soft magnetic alloy ribbon of the present embodiment. A use of the core includes, for example, a transformer in addition to the inductor. The transformer and the inductor are used in a power device or the like.

The core of the present embodiment is particularly suitable for a small-sized power device. Generally, the transformer and inductor occupy a large volume in the power device. Here, even when the core of the present embodiment is miniaturized, a sufficiently high saturation magnetic flux density can be obtained. Therefore, even when the volume of the transformer and the inductor using the core of the present embodiment is reduced, a maximum magnetic flux density at a time of driving the power device is easily increased. Therefore, the core of the present embodiment is particularly suitable for a small-sized power device.

Although the embodiments of the present invention have been described above, the present invention is not limited to the above embodiments.

Even when the soft magnetic alloy ribbon of the present embodiment is prepared in an air atmosphere, the oxidation state of the surface of the soft magnetic alloy ribbon can be controlled by using the release gas and the spray gas. Therefore, the oxidation of Fe on the surface of the soft magnetic alloy ribbon can be controlled uniformly, and the corrosion resistance of the soft magnetic alloy ribbon can be controlled. Further, when Fe is locally oxidized on the surface of the soft magnetic alloy ribbon, the oxidation of Fe proceeds in an atmosphere and an oxide phase of Fe tends to increase. Then, a total amount of magnetic materials in the soft magnetic alloy ribbon tends to decrease. Therefore, as described above, the soft magnetic alloy ribbon of the present embodiment is suitably used for a magnetic component whose saturation magnetic flux density is required to improve. Therefore, the magnetic component in the present embodiment is particularly suitable for miniaturization of a power supply circuit of an electronic device, an information device, a communication device, or the like.

EXAMPLES

Hereinafter, the present invention will be described in detail based on Examples.

Experimental Example 1

Raw materials were weighed to obtain an alloy composition shown in Table 1 to Table 3, and melted by high-frequency heating to prepare a base alloy.

Thereafter, the prepared base alloy was heated and melted to form a metal in a molten state at 1300° C., and then the metal was injected onto a roll by a single-roll method in which the roll was rotated at a rotation speed of 30 msec to prepare a ribbon. The material of the roll is Cu.

The roll was rotated in a direction shown in FIG. 4, and a roll temperature was set to 30° C. A differential pressure between an inside of the chamber and the injection nozzle (injection pressure) was set to 60 kPa. When a slit width of a slit nozzle was 50 mm, a distance from a slit opening to the roll was 0.2 mm, and a roll diameter was 300 mm, a ribbon having a thickness of 20 μm to 30 μm and a width of 50 mm was obtained.

Further, Table 1 shows oxygen concentrations of the release gas and the spray gas in the case of performing the single-roll method. A sample in which the oxygen concentration of the release gas and the spray gas was 0% was sprayed with $N_2$ gas, and a sample in which the oxygen concentration of the release gas and the spray gas was not 0% was sprayed with $N_2$—$O_2$ mixed gas.

It was confirmed whether the obtained ribbon was formed of amorphous substances or crystals. The amorphization ratio X of each ribbon was measured by using XRD, and when X was 85% or more, it was considered that the ribbon was formed of amorphous substances. The soft magnetic alloy ribbons shown in Table 1 and Table 2 were all formed of amorphous substances. The same applied to the soft magnetic alloy ribbons of sample Nos. 14 and 15 in Table 3.

Thereafter, the heat treatment was performed on ribbon of the sample No. 15 in Table 3 at a heat treatment temperature shown in Table 3 for 60 minutes in an $N_2$ atmosphere (oxygen concentration: 10 ppm or less). The crystal grain size of each ribbon (sample Nos. 16 and 17) after the heat treatment was measured by a transmission electron microscope. In the sample No. 16, it was confirmed that the soft magnetic alloy ribbon was composed of nanocrystals having a crystal grain size of 5 nm to 30 nm. In the sample No. 17, it was confirmed that the soft magnetic alloy ribbon was composed of nanocrystals having a crystal grain size larger than 30 nm. Table 3 shows results.

The concentration distribution of elements contained in the soft magnetic alloy ribbon was measured from the surface (thickness 0 nm) toward the interior in the thickness direction by using XPS for each obtained ribbon. The concentration distribution was measured such that a distance between measurement points was 1.6 nm in terms of $SiO_2$ in a region within 16 nm from the surface, and a distance between the measurement points was 3.2 nm in terms of $SiO_2$ in a region having a depth of 16 nm or more from the surface. Table 1 and Table 3 show the presence or absence of the maximum point of Si including in oxides, a position of the maximum point, a maximum value, and a value (hereinafter, described as maximum value/concentration in the interior) obtained by dividing the maximum value of the concentration of Si including in oxides at the maximum point of the concentration of Si including in oxides by the maximum value of the concentration of Si in the interior of the soft magnetic alloy ribbon. Further, Table 1 to Table 3 show the presence or absence of the maximum point of P, the position of the maximum point, the maximum value, and the maximum value/concentration in the interior of P. In a case of having the maximum point, it is denoted as "Yes", and in a case of not having the maximum point, it is denoted as "No".

For the ribbons shown in Table 3, the saturation magnetic flux density and the coercive force were measured. The saturation magnetic flux density was measured at a magnetic field of 1,500 kA/m using a vibrating sample magnetometer (VSM). The coercive force was measured at a magnetic field of 5 kA/m using a direct current BH tracer.

The obtained ribbon was subjected to a corrosion resistance test to confirm the corrosion resistance thereof. Specifically, each sample was inserted into a thermostatic chamber held at a temperature of 85° C. and a humidity of 85%, and the surface of each sample was visually observed every 30 minutes to confirm the presence or absence of a spot rust. Table 1 to Table 3 show a case where a time until the spot rust was observed for the first time was 2.0 times or more that of each Comparative Example (when $N_2$ gas was sprayed) as A, a case where the time until the spot rust was observed for the first time was 1.2 times or more and less than 2.0 times that of each Comparative Example as B, a case where the time until the spot rust was observed for the first time was greater than 1.0 time and less than 1.2 times that of each Comparative Example as C and a case where the time until the spot rust was observed for the first time was 1.0 time or less that of each Comparative Example as D. A case where the evaluation was C or better was regarded as good. A sample No. 1 is taken as a reference in Table 1 and Table 2, and a sample No. 14 is taken as a reference in Table 3.

TABLE 1

| No. | Example/ Comparative Example | $Fe_{(1-(a+b+c+d))}M_aB_bP_cSi_d$ ($\alpha = \beta = 0$) Fe | a (M = Nb) | b | c | d | Oxygen concentration (%) of release gas and spray gas | P Presence or absence of maximum point | P Position of maximum point (nm) |
|---|---|---|---|---|---|---|---|---|---|
| 1 | Comparative Example | 0.8200 | 0.0450 | 0.0900 | 0.0150 | 0.0300 | 0 | No | — |
| 2 | Example | 0.8200 | 0.0450 | 0.0900 | 0.0150 | 0.0300 | 0.5 | Yes | 2.3 |
| 3 | Example | 0.8200 | 0.0450 | 0.0900 | 0.0150 | 0.0300 | 1 | Yes | 3.1 |
| 4 | Example | 0.8200 | 0.0450 | 0.0900 | 0.0150 | 0.0300 | 5 | Yes | 5.6 |
| 5 | Example | 0.8200 | 0.0450 | 0.0900 | 0.0150 | 0.0300 | 20 | Yes | 8.1 |
| 6 | Example | 0.8200 | 0.0450 | 0.0900 | 0.0150 | 0.0300 | 30 | Yes | 9.6 |
| 7 | Example | 0.8200 | 0.0450 | 0.0900 | 0.0150 | 0.0300 | 50 | Yes | 9.9 |
| 8 | Example | 0.8200 | 0.0450 | 0.0900 | 0.0150 | 0.0300 | 100 | Yes | 10.1 |

| No. | P Maximum value (at %) | P Maximum value/ concentration in the interior | Si Presence or absence of maximum point | Si Position of maximum point (nm) | Si Maximum value (at %) | Si Maximum value/ concentration in the interior | Corrosion resistance |
|---|---|---|---|---|---|---|---|
| 1 | — | — | Yes | 1.2 | 1.0 | 0.33 | D |
| 2 | 1.6 | 1.07 | Yes | 1.8 | 1.4 | 0.47 | C |
| 3 | 1.7 | 1.13 | Yes | 2.5 | 1.6 | 0.53 | C |
| 4 | 1.9 | 1.27 | Yes | 3.8 | 4.3 | 1.43 | B |
| 5 | 2.2 | 1.47 | Yes | 4.9 | 5.1 | 1.70 | B |
| 6 | 3.2 | 2.13 | Yes | 6.4 | 7.1 | 2.37 | A |
| 7 | 3.8 | 2.53 | Yes | 6.7 | 8.3 | 2.77 | A |
| 8 | 4.2 | 2.80 | Yes | 7.2 | 9.2 | 3.07 | A |

TABLE 2

| No. | Example/ Comparative Example | $Fe_{(1-(a+b+c+d))}M_aB_bP_cSi_d$($\alpha = \beta = 0$) Fe | a | b | c | d | Oxygen concentration (%) of release gas and spray gas | P Presence or absence of maximum point | P Position of maximum point (nm) |
|---|---|---|---|---|---|---|---|---|---|
| 6 | Example | 0.8200 | 0.0450 | 0.0900 | 0.0150 | 0.0300 | 30 | Yes | 9.8 |
| 9 | Example | 0.8200 | 0.0450 | 0.0900 | 0.0150 | 0.0300 | 30 | Yes | 9.7 |
| 10 | Example | 0.8200 | 0.0450 | 0.0900 | 0.0150 | 0.0300 | 30 | Yes | 9.4 |
| 11 | Example | 0.8200 | 0.0450 | 0.0900 | 0.0150 | 0.0300 | 30 | Yes | 10.0 |
| 12 | Example | 0.8200 | 0.0450 | 0.0900 | 0.0150 | 0.0300 | 30 | Yes | 10.2 |
| 13 | Example | 0.8200 | 0.0450 | 0.0900 | 0.0150 | 0.0300 | 30 | Yes | 9.5 |

| No. | P Maximum value (at %) | P Maximum value/ concentration in the interior | Si Presence or absence of maximum point | Si Position of maximum point (nm) | Si Maximum value (at %) | Si Maximum value/ concentration in the interior | Kind of M element | Corrosion resistance |
|---|---|---|---|---|---|---|---|---|
| 6 | 2.8 | 1.87 | Yes | 6.5 | 7.5 | 2.50 | Nb | A |
| 9 | 2.6 | 1.73 | Yes | 6.4 | 7.4 | 2.47 | Ta | A |
| 10 | 2.7 | 1.80 | Yes | 6.1 | 7.2 | 2.40 | W | A |
| 11 | 2.5 | 1.67 | Yes | 6.6 | 7.1 | 2.37 | Zr | A |
| 12 | 2.9 | 1.93 | Yes | 6.7 | 7.2 | 2.40 | Hf | A |
| 13 | 2.6 | 1.73 | Yes | 6.2 | 7.3 | 2.43 | Mo | A |

TABLE 3

| No. | Example/ Comparative Example | $(Fe_{(1-\beta)}Cu_\beta)_{(1-(a+b+c+d))}M_aB_bP_cSi_d$ Fe | a (M = Nb) | b | c | d | β (X2 = Cu) | Oxygen concentration (%) of release gas and spray gas |
|---|---|---|---|---|---|---|---|---|
| 14 | Comparative Example | 0.7700 | 0.0300 | 0.1000 | 0.0300 | 0.0600 | 0.0100 | 0 |
| 15 | Example | 0.7700 | 0.0300 | 0.1000 | 0.0300 | 0.0600 | 0.0100 | 30 |
| 16 | Example | 0.7700 | 0.0300 | 0.1000 | 0.0300 | 0.0600 | 0.0100 | 30 |
| 17 | Example | 0.7700 | 0.0300 | 0.1000 | 0.0300 | 0.0600 | 0.0100 | 30 |

| No. | Heat treatment temperature | Microstructure | P Presence or absence of maximum point | P Position of maximum point (nm) | P Maximum value (at %) | P Maximum value/ concentration in the interior | Si Presence or absence of maximum point |
|---|---|---|---|---|---|---|---|
| 14 | No heat treatment | Amorphous | No | — | — | — | Yes |
| 15 | No heat treatment | Amorphous | Yes | 8.6 | 5.2 | 1.73 | Yes |
| 16 | 550 | Nanocrystalline | Yes | 8.4 | 5.5 | 1.83 | Yes |
| 17 | 650 | Crystalline | Yes | 8.2 | 4.8 | 1.60 | Yes |

| No. | Si Position of maximum point (nm) | Si Maximum value (at %) | Si Maximum value/ concentration in the interior | Saturation magnetic flux density (T) | Coercive force (A/m) | Corrosion resistance |
|---|---|---|---|---|---|---|
| 14 | 1.5 | 1.2 | 0.20 | 1.29 | 7.3 | D |
| 15 | 5.7 | 12.3 | 2.05 | 1.31 | 7.0 | A |
| 16 | 5.3 | 13.1 | 2.18 | 1.40 | 5.2 | A |
| 17 | 5.5 | 12.9 | 2.15 | 1.45 | 189 | B |

As seen from Table 1, when the maximum point of the concentration of Si including in oxides and the maximum point of the concentration of P are present in a region within 20 nm from the surface, the corrosion resistance is excellent as compared with a case where neither one of the maximum point of the concentration of Si including in oxides and the maximum point of the concentration of P is not present in the region within 20 nm from the surface.

In a case where the maximum point of the concentration of P is farther from the surface than the maximum point of the concentration of Si including in oxides, when the maximum value/the concentration of P in the interior is 1.5 times or more, and when the maximum value/the concentration of Si in the interior is 2.0 times or more, the corrosion resistance is particularly improved.

As seen from Table 2, similar results are obtained even when the kind of M element is changed from Nb.

As seen from Table 3, when the maximum point of the concentration of Si including in oxides and the maximum point of the concentration of P are present in the region within 20 nm from the surface regardless of a change in the microstructure due to the heat treatment, the corrosion resistance is excellent as compared with a case where neither one of the maximum point of the concentration of Si including in oxides and the maximum point of the concentration of P is not present in the region within 20 nm from the surface.

Experimental Example 2

The same experiment as in each of Experimental Examples shown in Table 1 was conducted after changing the composition from Experimental Example 1. Table 4 to Table 7 show results. For the corrosion resistance test, a sample No. 18 is taken as a reference in Table 4, a sample No. 28 is taken as a reference in Table 5, a sample No. 36 is taken as a reference in Table 6, and a sample No. 41 is taken as a reference in Table 7. It was confirmed that soft magnetic alloy ribbons of Example and Comparative Example were formed of amorphous substances.

TABLE 4

| No. | Example/ Comparative Example | $Fe_{(1-(a+b+c+d))}M_aB_bP_cSi_d(\alpha = \beta = 0)$ Fe | a (M = Nb) | b | c | d | Oxygen concentration (%) of release gas and spray gas | P Presence or absence of maximum point | P Position of maximum point (nm) |
|---|---|---|---|---|---|---|---|---|---|
| 18 | Comparative Example | 0.7900 | 0.0600 | 0.1195 | 0.0300 | 0.0005 | 0 | No | — |

TABLE 4-continued

| | | | | | | | | | |
|---|---|---|---|---|---|---|---|---|---|
| 19 | Example | 0.7900 | 0.0600 | 0.1195 | 0.0300 | 0.0005 | 30 | Yes | 8.5 |
| 20 | Example | 0.7900 | 0.0600 | 0.1190 | 0.0300 | 0.0010 | 30 | Yes | 8.9 |
| 21 | Example | 0.7900 | 0.0600 | 0.1100 | 0.0300 | 0.0100 | 30 | Yes | 8.8 |
| 22 | Example | 0.7900 | 0.0600 | 0.0900 | 0.0300 | 0.0300 | 30 | Yes | 8.7 |
| 23 | Example | 0.7900 | 0.0600 | 0.0800 | 0.0300 | 0.0400 | 30 | Yes | 8.7 |
| 24 | Example | 0.7900 | 0.0600 | 0.0700 | 0.0300 | 0.0500 | 30 | Yes | 8.4 |
| 25 | Example | 0.7900 | 0.0600 | 0.0400 | 0.0300 | 0.0800 | 30 | Yes | 8.6 |
| 26 | Example | 0.7900 | 0.0600 | 0.0200 | 0.0300 | 0.1000 | 30 | Yes | 8.8 |
| 27 | Example | 0.7900 | 0.0600 | 0.0100 | 0.0300 | 0.1100 | 30 | Yes | 8.7 |

| | P | | Si | | | | |
|---|---|---|---|---|---|---|---|
| No. | Maximum value (at %) | Maximum value/ concentration in the interior | Presence or absence of maximum point | Position of maximum point (nm) | Maximum value (at %) | Maximum value/ concentration in the interior | Corrosion resistance |
| 18 | — | — | Yes | 4.9 | 0.2 | 4.00 | D |
| 19 | 5.3 | 1.77 | Yes | 4.3 | 0.4 | 8.00 | C |
| 20 | 5.2 | 1.73 | Yes | 5.7 | 0.5 | 5.00 | B |
| 21 | 5.5 | 1.83 | Yes | 6.1 | 2.4 | 2.40 | A |
| 22 | 5.4 | 1.80 | Yes | 6.4 | 7.7 | 2.57 | A |
| 23 | 5.3 | 1.77 | Yes | 6.4 | 8.2 | 2.05 | A |
| 24 | 5.6 | 1.87 | Yes | 6.6 | 10.4 | 2.08 | A |
| 25 | 5.3 | 1.77 | Yes | 6.9 | 16.2 | 2.03 | B |
| 26 | 5.5 | 1.83 | Yes | 7.2 | 20.8 | 2.08 | B |
| 27 | 5.7 | 1.90 | Yes | 7.4 | 23.1 | 2.10 | C |

TABLE 5

| | | | | | | | | P | |
|---|---|---|---|---|---|---|---|---|---|
| | Example/ Comparative | $Fe_{(1-(a+b+c+d))}M_aB_bP_cSi_d(\alpha = \beta = 0)$ | | | | | Oxygen concentration (%) of release gas | Presence or absence of maximum | Position of maximum point |
| No. | Example | Fe | a (M = Nb) | b | c | d | and spray gas | point | (nm) |
| 28 | Comparative Example | 0.7900 | 0.0600 | 0.1195 | 0.0005 | 0.0300 | 0 | No | — |
| 29 | Example | 0.7900 | 0.0600 | 0.1195 | 0.0005 | 0.0300 | 30 | Yes | 7.1 |
| 30 | Example | 0.7900 | 0.0600 | 0.1190 | 0.0010 | 0.0300 | 30 | Yes | 7.5 |
| 31 | Example | 0.7900 | 0.0600 | 0.1100 | 0.0100 | 0.0300 | 30 | Yes | 8.2 |
| 32 | Example | 0.7900 | 0.0600 | 0.1000 | 0.0200 | 0.0300 | 30 | Yes | 8.4 |
| 22 | Example | 0.7900 | 0.0600 | 0.0900 | 0.0300 | 0.0300 | 30 | Yes | 8.7 |
| 33 | Example | 0.7900 | 0.0600 | 0.0800 | 0.0400 | 0.0300 | 30 | Yes | 8.5 |
| 34 | Example | 0.7900 | 0.0600 | 0.0400 | 0.0800 | 0.0300 | 30 | Yes | 9.3 |
| 35 | Example | 0.7900 | 0.0600 | 0.0100 | 0.1100 | 0.0300 | 30 | Yes | 9.6 |

| | P | | Si | | | | |
|---|---|---|---|---|---|---|---|
| No. | Maximum value (at %) | Maximum value/ concentration in the interior | Presence or absence of maximum point | Position of maximum point (nm) | Maximum value (at %) | Maximum value/ concentration in the interior | Corrosion resistance |
| 28 | — | — | Yes | 7 | 1.1 | 0.37 | D |
| 29 | 0.2 | 4.00 | Yes | 6.7 | 7.4 | 2.47 | C |
| 30 | 0.3 | 3.00 | Yes | 6.6 | 7.4 | 2.47 | A |
| 31 | 1.6 | 1.60 | Yes | 6.6 | 7.5 | 2.50 | A |
| 32 | 3.2 | 1.60 | Yes | 6.5 | 7.6 | 2.53 | A |
| 22 | 5.4 | 1.80 | Yes | 6.4 | 7.7 | 2.57 | A |
| 33 | 6.2 | 1.55 | Yes | 6.3 | 7.8 | 2.60 | A |
| 34 | 12.5 | 1.56 | Yes | 6.5 | 7.6 | 2.53 | B |
| 35 | 16.6 | 1.51 | Yes | 6.4 | 7.2 | 2.40 | C |

TABLE 6

| No. | Example/ Comparative Example | Fe | a (M = Nb) | b | c | d | Oxygen concentration (%) of release gas and spray gas | P Presence or absence of maximum point | P Position of maximum point (nm) |
|---|---|---|---|---|---|---|---|---|---|
| | | $Fe_{(1-(a+b+c+d))}M_aB_bP_cSi_d(\alpha = \beta = 0)$ | | | | | | | |
| 36 | Comparative Example | 0.7500 | 0.0600 | 0.1500 | 0.0300 | 0.0100 | 0 | No | — |
| 37 | Example | 0.7500 | 0.0600 | 0.1500 | 0.0300 | 0.0100 | 30 | Yes | 8.7 |
| 38 | Example | 0.7500 | 0.1000 | 0.1100 | 0.0300 | 0.0100 | 30 | Yes | 8.5 |
| 39 | Example | 0.7500 | 0.1500 | 0.0600 | 0.0300 | 0.0100 | 30 | Yes | 8.6 |
| 40 | Example | 0.7500 | 0.2000 | 0.0100 | 0.0300 | 0.0100 | 30 | Yes | 8.7 |

| No. | P Maximum value (at %) | P Maximum value/ concentration in the interior | Si Presence or absence of maximum point | Si Position of maximum point (nm) | Si Maximum value (at %) | Si Maximum value/ concentration in the interior | Corrosion resistance |
|---|---|---|---|---|---|---|---|
| 36 | — | — | Yes | 6.8 | 0.7 | 0.70 | D |
| 37 | 5.4 | 1.80 | Yes | 6.1 | 2.1 | 2.10 | A |
| 38 | 5.6 | 1.87 | Yes | 6.2 | 2.3 | 2.30 | A |
| 39 | 5.5 | 1.83 | Yes | 6.4 | 2.2 | 2.20 | A |
| 40 | 5.6 | 1.87 | Yes | 6.3 | 2.3 | 2.30 | A |

TABLE 7

| No. | Example/ Comparative Example | Fe | a (M = Nb) | b | c | d | Oxygen concentration (%) of release gas and spray gas | P Presence or absence of maximum point | P Position of maximum point (nm) |
|---|---|---|---|---|---|---|---|---|---|
| | | $Fe_{(1-(a+b+c+d))}M_aB_bP_cSi_d(\alpha = \beta = 0)$ | | | | | | | |
| 41 | Comparative Example | 0.7400 | 0.0250 | 0.0500 | 0.1500 | 0.0350 | 0 | No | — |
| 42 | Example | 0.7400 | 0.0250 | 0.0500 | 0.1500 | 0.0350 | 30 | Yes | 10.3 |
| 43 | Example | 0.7400 | 0.0250 | 0.0500 | 0.0650 | 0.1200 | 30 | Yes | 9.1 |
| 44 | Example | 0.7400 | 0.0250 | 0.0500 | 0.0350 | 0.1500 | 30 | Yes | 8.6 |
| 45 | Example | 0.7400 | 0.0250 | 0.0500 | 0.0050 | 0.1800 | 30 | Yes | 7.3 |

| No. | P Maximum value (at %) | P Maximum value/ concentration in the interior | Si Presence or absence of maximum point | Si Position of maximum point (nm) | Si Maximum value (at %) | Si Maximum value/ concentration in the interior | Corrosion resistance |
|---|---|---|---|---|---|---|---|
| 41 | — | — | Yes | 6.1 | 1.1 | 0.31 | D |
| 42 | 21.2 | 1.41 | Yes | 6.3 | 6.8 | 1.94 | B |
| 43 | 9.3 | 1.43 | Yes | 6.8 | 19.4 | 1.62 | B |
| 44 | 4.8 | 1.37 | Yes | 6.6 | 25.2 | 1.68 | B |
| 45 | 0.7 | 1.40 | Yes | 6.3 | 29.6 | 1.64 | B |

As seen from Table 4 to Table 7, when the maximum point of the concentration of Si including in oxides and the maximum point of the concentration of P are present in a region within 20 nm from the surface even when the composition is changed, the corrosion resistance is excellent as compared with a case where the maximum point of the concentration of Si including in oxides and the maximum point of the concentration of P is not present in the region within 20 nm from the surface.

In particular, as seen from Table 4, when the composition ratio of Si is 0.1 at % or more and 10 at % or less, that is, $0.001 \leq d \leq 0.100$ is satisfied, the corrosion resistance is increased, and when the composition ratio of Si is 1.0 at % or more and 5.0 at % or less, the corrosion resistance is further increased. As seen from Table 5, the corrosion resistance is further increased when the composition ratio of P is 0.1 at % or more and 4.0 at % or less.

Experimental Example 3

The composition of the soft magnetic alloy ribbon was changed to a commonly used composition, and the same experiment as in each of Experimental Examples shown in Table 1 was conducted. For the corrosion resistance test, a sample No. 45 is taken as a reference for a sample No. 46, and a sample No. 47 is taken as a reference for a sample No. 48. Table 8 shows results.

TABLE 8

| No. | Example/ Comparative Example | Composition | Oxygen concentration (%) of release gas and spray gas | P: Presence or absence of maximum point | P: Position of maximum point (nm) | P: Maximum value (at %) | P: Maximum value/ concentration in the interior |
|---|---|---|---|---|---|---|---|
| 46 | Comparative Example | $Fe_{85}Si_2B_8P_4Cu_1$ | 0 | No | — | — | — |
| 47 | Example | $Fe_{85}Si_2B_8P_4Cu_1$ | 30 | Yes | 8.3 | 6.4 | 1.60 |
| 48 | Comparative Example | $Fe_{77}P_7B_{11}Nb_2Cr_1Si_2$ | 0 | No | — | — | — |
| 49 | Example | $Fe_{77}P_7B_{11}Nb_2Cr_1Si_2$ | 30 | Yes | 9.1 | 11.3 | 1.61 |

| No. | Si: Presence or absence of maximum point | Si: Position of maximum point (nm) | Si: Maximum value (at %) | Si: Maximum value/ concentration in the interior | Corrosion resistance |
|---|---|---|---|---|---|
| 46 | Yes | 4.3 | 0.7 | 0.35 | D |
| 47 | Yes | 6.2 | 5.4 | 2.70 | A |
| 48 | Yes | 4.5 | 0.6 | 0.30 | D |
| 49 | Yes | 6.4 | 5.7 | 2.85 | A |

As seen from Table 8, when the maximum point of the concentration of Si including in oxides and the maximum point of the concentration of P are present in a region within 20 nm from the surface even when the composition is changed, the corrosion resistance is excellent as compared with a case where neither one of the maximum point of the concentration of Si including in oxides and the maximum point of the concentration of P is not present in the region within 20 nm from the surface.

REFERENCE SIGNS LIST

21 nozzle
22 molten metal
23 roll
24 soft magnetic alloy ribbon
25 chamber
26 release gas injection device
27 spray gas injection device

What is claimed is:

1. A soft magnetic alloy ribbon, comprising:
Fe;
P;
Si; and
M, wherein M is one or more selected from the group consisting of Nb, Ta, W, Zr, Hf, Mo, Cr, and Ti, wherein
a content of M is from 2.0 at % or more to 8.0 at % or less,
a content of P is from 0.5 at % or more to 15 at % or less,
a maximum point of an atomic concentration of P, and a maximum point of an atomic concentration of Si included in oxides are present in a region within 20 nm from the surface, when an atomic concentration distribution of an element contained in the soft magnetic alloy ribbon is measured from a surface toward an interior of the soft magnetic alloy ribbon in a thickness direction,
a maximum value of the atomic concentration of P at the maximum point of the atomic concentration of P is 1.5 times or more of an atomic concentration of P in the interior of the soft magnetic alloy ribbon,
a total amount of substitution of Fe by at least one of X1 and X2 is zero or more and a half or less of Fe based on a number of atoms, where X1 is at least one selected from the group consisting of Co and Ni, and X2 is at least one selected from the group consisting of Al, Mn, Ag, Zn, Sn, As, Sb, Cu, Bi, S, N, O, and a rare earth element, and
a total amount of Fe, X1, and X2 is 70 at % or more and 90 at % or less,
a maximum value of the atomic concentration of Si at the maximum point of the atomic concentration of Si is 2.0 times or more of an atomic concentration of Si in the interior of the soft magnetic alloy ribbon, and
the atomic concentration of Si in the interior of the soft magnetic alloy ribbon is an average value of the atomic concentration of Si in a portion that is 1.0 μm to 1.3 μm from the surface.

2. The soft magnetic alloy ribbon of claim 1, wherein the maximum point of the atomic concentration of P is farther from the surface than the maximum point of the atomic concentration of Si.

3. The soft magnetic alloy ribbon of claim 1, wherein a content of Si is from 0.1 at % or more to 10 at % or less.

4. The soft magnetic alloy ribbon of claim 1, wherein the content of P is from 0.5 at % or more to less than 4.0 at %.

5. The soft magnetic alloy ribbon of claim 1, wherein amorphous is observed in the ribbon.

6. The soft magnetic alloy ribbon of claim 1, wherein nanocrystals are included in the ribbon.

7. A magnetic component, comprising the soft magnetic alloy ribbon of claim 1.

* * * * *